United States Patent
Berthoud et al.

(10) Patent No.: US 10,247,959 B2
(45) Date of Patent: Apr. 2, 2019

(54) ARTICULATED ASSEMBLY

(71) Applicant: VON ARKEL SA, Morges (CH)

(72) Inventors: Stephane Berthoud, Le Sentier (CH); Olivier Gumy, Lausanne (CH)

(73) Assignee: VON ARKEL SA, Morges (CH)

( * ) Notice: Subject to any disclaimer, the term of this patent is extended or adjusted under 35 U.S.C. 154(b) by 33 days.

(21) Appl. No.: 15/310,879

(22) PCT Filed: Apr. 21, 2015

(86) PCT No.: PCT/IB2015/052910
§ 371 (c)(1),
(2) Date: Nov. 14, 2016

(87) PCT Pub. No.: WO2015/173678
PCT Pub. Date: Nov. 19, 2015

(65) Prior Publication Data
US 2017/0082867 A1    Mar. 23, 2017

(30) Foreign Application Priority Data

May 14, 2014  (CH) .................................. 00727/14
Nov. 18, 2014 (CH) .................................. 01779/14

(51) Int. Cl.
*G02C 5/22* (2006.01)
*F16C 11/04* (2006.01)
*G02C 1/08* (2006.01)

(52) U.S. Cl.
CPC .......... *G02C 5/2209* (2013.01); *F16C 11/045* (2013.01); *G02C 1/08* (2013.01);
(Continued)

(58) Field of Classification Search
CPC ........ G02C 5/2209; G02C 5/22; F16C 11/045
(Continued)

(56) References Cited

U.S. PATENT DOCUMENTS

| | | | | |
|---|---|---|---|---|
| 1,504,212 A | * | 8/1924 | Carlson | G02C 5/2209 351/153 |
| 7,484,844 B2 | * | 2/2009 | Spandl | G02C 5/008 16/228 |
| 8,414,120 B2 | * | 4/2013 | Cheong | G02C 5/2209 351/153 |

FOREIGN PATENT DOCUMENTS

| | | |
|---|---|---|
| CN | 201673314 | 12/2010 |
| EP | 0 945 751 A1 | 9/1999 |

(Continued)

OTHER PUBLICATIONS

Machine translation of Hwang WO2015012428.*
International Search Report, dated Aug. 6, 2015, from corresponding PCT Application.

*Primary Examiner* — Kristina M Deherrera
(74) *Attorney, Agent, or Firm* — Young & Thompson

(57) ABSTRACT

An articulated assembly includes a first piece connected to a second piece by a screwless hinge having a body with a cylindrical axial recess of revolution which opens onto at least one of the axial faces of the body and a cylindrical hub of revolution, with a diameter corresponding to that of the axial recess, fully housed in the axial recess; this hub including a radial cavity opening onto its periphery, and the lateral wall of the body having an opening of predetermined angular extent. The first piece includes an end provided with fixing elements arranged to be fixedly attached to the hinge body, the second piece includes an end provided with coupling elements suitable for being introduced into the radial cavity through the body opening and with retaining elements cooperating, in the in-use position introduced into the axial cavity of the hub, with the cylindrical wall of revolution.

21 Claims, 19 Drawing Sheets

(52) U.S. Cl.
CPC ............ *G02C 5/22* (2013.01); *G02C 2200/12* (2013.01); *G02C 2200/20* (2013.01)

(58) Field of Classification Search
USPC .................................. 351/153, 106; 16/228
See application file for complete search history.

(56) References Cited

FOREIGN PATENT DOCUMENTS

| | | |
|---|---|---|
| FR | 2 923 621 A1 | 5/2009 |
| FR | 2 983 315 B1 | 10/2014 |
| KR | 10-1390038 A1 | 4/2014 |
| WO | 2015/012428 A1 | 1/2015 |

\* cited by examiner

Fig.31
Fig.32
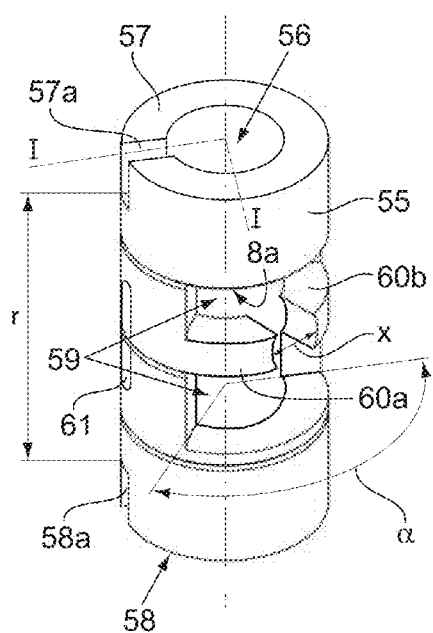
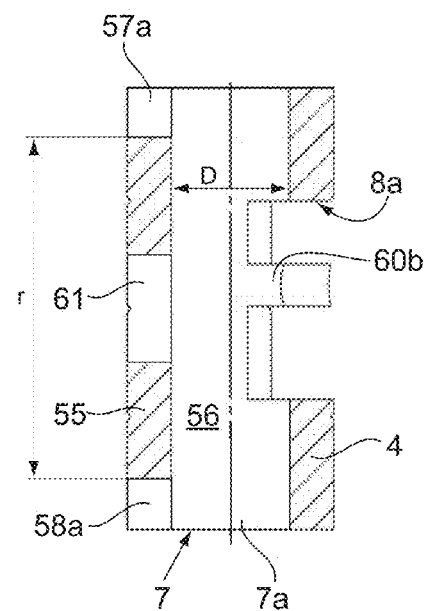

ARTICULATED ASSEMBLY

BACKGROUND OF THE INVENTION

Field Of The Invention

The present invention relates to an articulated assembly comprising a first piece connected to a second piece using a hinge. More particularly, this invention relates to articulation systems having small dimensions and high precision used in particular in horology, jewellery, spectacle-making and in the leather trade.

Description Of The Related Art

The vast majority of articulation systems currently used in these fields comprise screws or pins used as a pivoting axis and as linking elements. These articulation systems are not satisfactory because the screws become loose, as does the articulation. Furthermore, these articulation systems render the after-sales service more complicated as it requires special tools.

FR 2983315 discloses an articulated device with a screwless hinge comprising a pivoting pin in two parts fixed to a first member and an articulation element likewise in two parts fixed to a second member. The parts of the pivoting pin and that of the articulation element are complex in shape and difficult to manufacture.

BRIEF SUMMARY OF THE INVENTION

The present invention relates to an articulated assembly comprising a first piece connected to a second piece by a screwless hinge comprising a limited number of simple components which are easy to manufacture, so as to obviate the disadvantages of existing devices.

The present invention relates to an articulated assembly comprising a first piece connected to a second piece by a screwless hinge, the hinge comprising a body having a cylindrical axial recess of revolution opening onto at least one of the axial faces of the body and a cylindrical hub of revolution, with a diameter corresponding to the diameter of the axial recess of the body, fully housed in said axial recess, this hub comprising a radial cavity opening onto the periphery thereof and the lateral wall of the body comprising an opening with a predetermined angular extent, the first piece comprising an end provided with fixing elements arranged to be fixedly attached to the body of the hinge, the second piece comprising an end provided with coupling elements suitable for being introduced into the radial cavity of the hub through the opening of the body and comprising retaining means cooperating, in the in-use position introduced into the axial cavity of the hub, with the cylindrical wall of revolution of the axial recess of the body, the articulated assembly arranged such that the first piece is articulated on the second piece about the axis of the axial recess of the body over an angular extent substantially corresponding to the angular extent of the opening of said body.

The present invention also relates to a screwless hinge as well as a first piece and a second piece to be connected by this screwless hinge, considered separately.

Finally, the present invention further relates to a spectacles frame fitted with articulated assemblies.

BRIEF DESCRIPTION OF THE DRAWINGS

The accompanying drawing schematically illustrates, by way of example, several embodiments of an articulated assembly in accordance with the invention and its use for producing spectacles frames.

FIG. 31 illustrates the body of the hinge in accordance with this final embodiment.

FIG. 32 illustrates the hub of the hinge in accordance with this final embodiment.

DETAILED DESCRIPTION OF THE PREFERRED EMBODIMENTS

Figure 1:
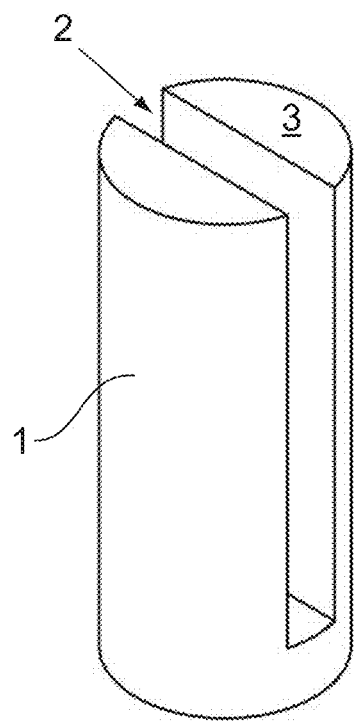
FIG. 1 illustrates a perspective view of the pin or hub of a hinge of the articulated assembly in accordance with the invention.
Figure 2:
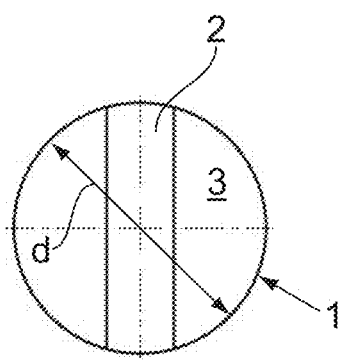
FIG. 2 is a top view of the hub of the hinge illustrated in FIG. 1.
Figure 3:
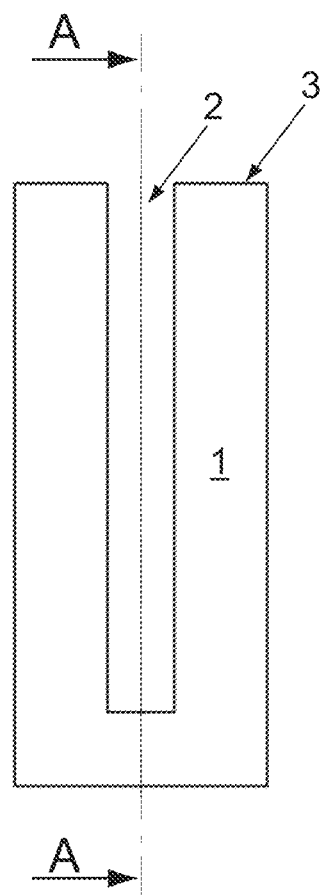
FIG. 3 is a side view of the hub illustrated in FIG. 1.
Figure 4:
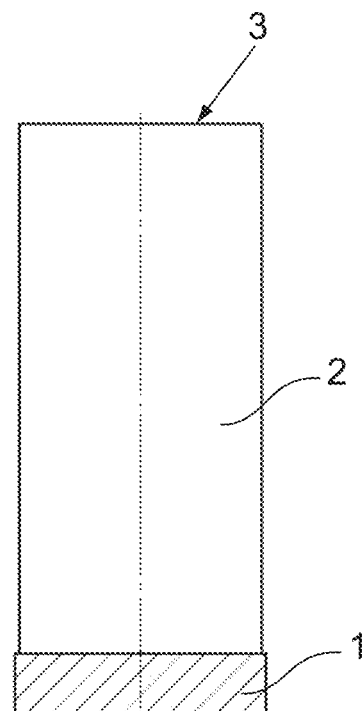
FIG. 4 is an axial sectional view of the hub of the hinge along line A-A in FIG. 3.
Figure 5:
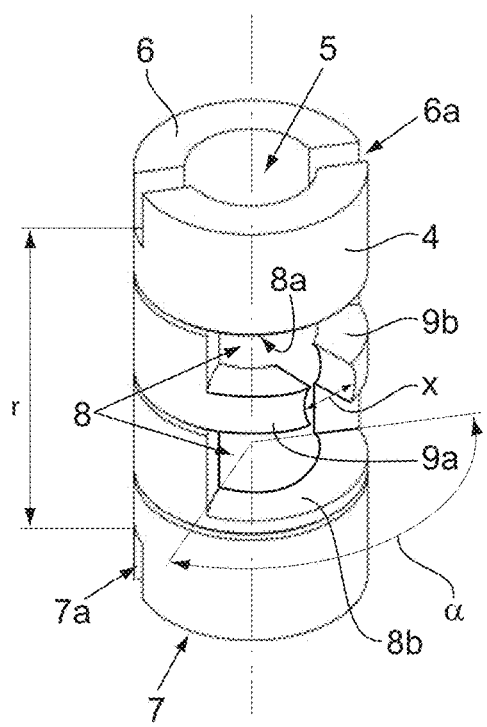
FIG. 5 is a perspective view of the body or barrel of the hinge of the articulated assembly in accordance with the invention.
Figure 9:
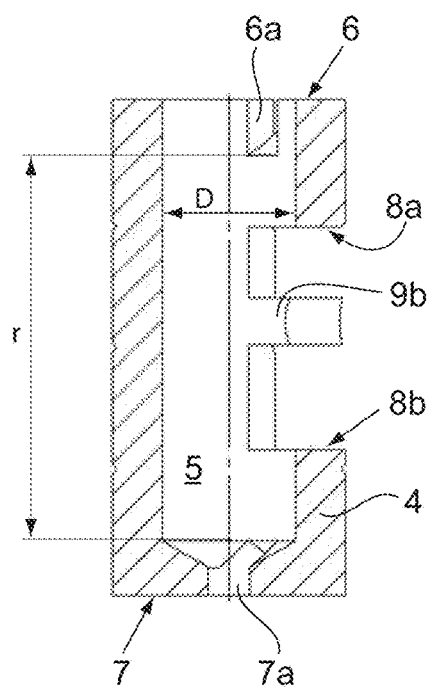
FIG. 9 is a sectional view along line B-B in FIG. 6.
Figure 6:
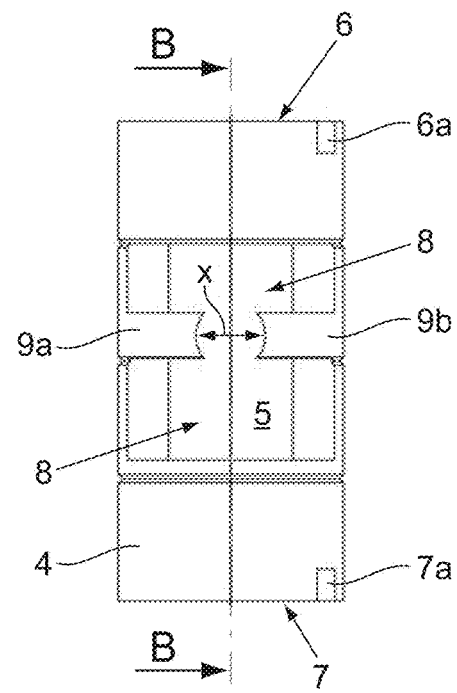
FIG. 6 is a side elevation of the barrel illustrated in FIG. 5.
Figure 7:
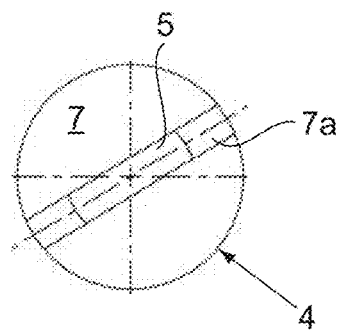
FIG. 7 is a bottom view of FIG. 6.
Figure 8:
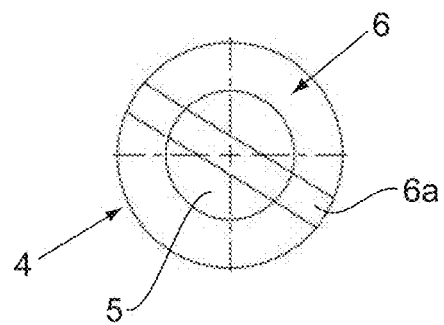
FIG. 8 is a top view of FIG. 6.
Figure 10:
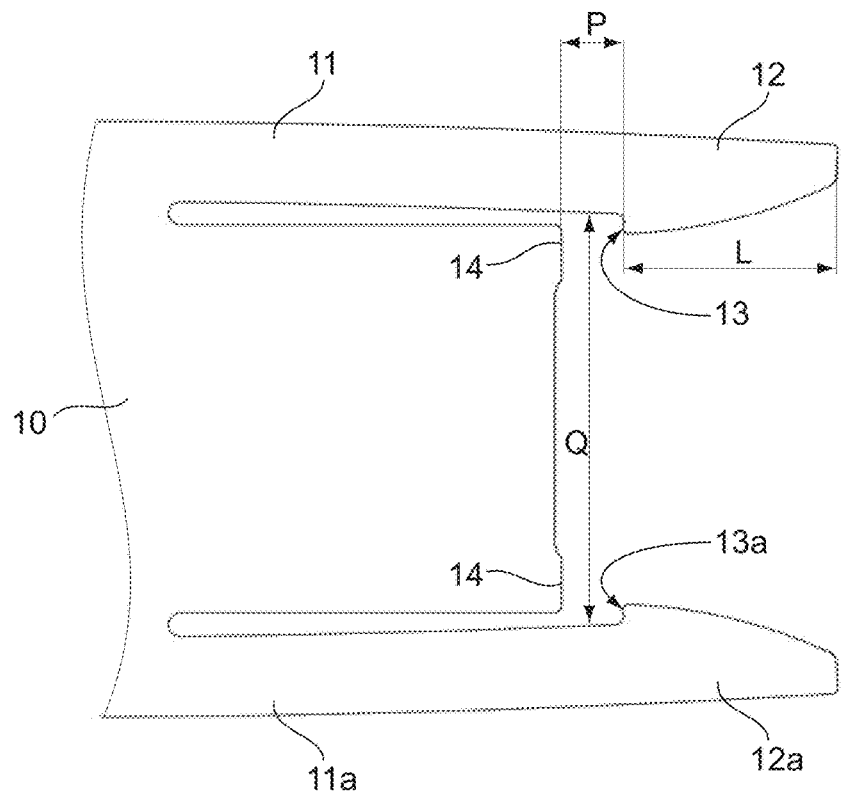
FIG. 10 is a plan view of the end of a first piece of the hinge suitable for being fixedly attached to the barrel of this hinge.
Figure 11:
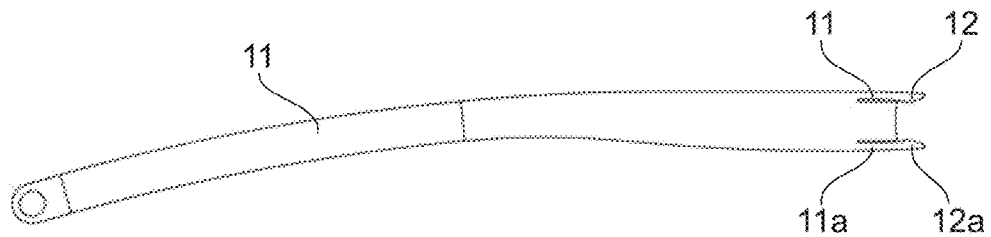
FIG. 11 illustrates the first piece of the articulated assembly formed by a temple of a spectacles frame.

Generally, the articulated assembly comprises a first piece connected to a second piece by a screwless hinge.

This hinge comprises a body or barrel having a cylindrical axial recess of revolution opening onto at least one of the axial faces of the barrel and a cylindrical pin or hub of revolution with a diameter corresponding to the diameter of the axial recess of the barrel. This hub is fully housed in the barrel and comprises a radial cavity opening onto the periphery. The lateral wall of the barrel, for its part, comprises an opening with a predetermined angular extent.

The first piece comprises an end provided with fixing elements arranged to be fixedly attached to the barrel of the hinge.

The second piece, for its part, comprises an end provided with coupling elements suitable for being introduced into the radial cavity of the hub through the opening of the barrel such that the hub and the second piece are rotationally fixed or coupled. This end of the second piece comprises retaining means cooperating, in the in-use position introduced into the radial cavity of the hub, with the cylindrical wall of revolution of the axial recess of the barrel.

The entire system is arranged such that the first piece is articulated relative to the second piece about the axis of the axial recess of the barrel over an angular extent substantially corresponding to the angular extent of the opening of the barrel.

Such an articulated assembly can be assembled and disassembled easily without the use of tools and does not comprise any screws to hold the articulated assembly in the assembled in-use position.

This articulated assembly has many applications in very different fields, e.g. in the leather trade for connecting a latch to a flap of a bag or to the cover of a suitcase, for connecting a loop to a strap to form a belt. In horology, this articulated assembly allows a watch strap strip to be connected to a watch casing. In jewellery, this articulated assembly can be used as a clasp for a bracelet or necklace. In spectacle-making, this articulated assembly allows the spectacles frame to be produced, the temples of the frame being articulated on the middle part of the frame, supporting the lenses, by hinges in accordance with those of the articulated assembly in accordance with the invention. Many other applications of the articulated assembly are feasible but hereinafter particular embodiments of the articulated assembly in accordance with the invention are described which relate to the application of the articulated assembly in the field of spectacle-making, by way of example.

A first embodiment of the articulated assembly in accordance with the invention is described with reference to FIGS. 1 to 14 of the accompanying drawing, and is used for the articulation of temples of a spectacles frame on the central part of this spectacles frame supporting the lenses.

As stated above, the articulated assembly is formed of a first piece formed in this example by a temple of the spectacles frame, a second piece formed in this example by the middle, central part of the spectacles frame, and a hinge.

In this first embodiment, the hinge is formed of a cylindrical pin or hub of revolution 1 which comprises a radial cavity formed by a slot 2. In this embodiment, this radial slot 2 is located in an axial plane of the hub and diametrically passes through the hub from one side to the other. This radial slot 2 thus opens onto both sides of the hub on its peripheral surface. In this embodiment, this radial slot 2 likewise opens onto one of the axial faces 3 of the hub 1. This hub 1 has a diameter d and is shown in FIGS. 1 to 4.

The hinge further comprises a body formed in this embodiment of the articulated assembly by a barrel 4 having a cylindrical axial recess of revolution 5 which opens onto at least the upper axial face 6 of the barrel 4. The upper 6 and lower 7 axial faces each comprise a diametric groove 6a, 7a, which grooves are located in the same axial plane of the barrel 4. This barrel 4 further comprises an opening 8 formed in its peripheral wall thus connecting the exterior of the barrel 4 to its axial recess 5. The angular extent α of this opening 8 of the barrel 4 has a pre-established value determined by the value of the angle of rotation that the first piece, in this case the temple of the spectacles frame, must be able to cover with respect to the second piece, in this case the central part of the spectacles frame.

In this first embodiment, the opening 8 is separated into two parts by arms 9a, 9b formed by portions of the cylindrical wall of the barrel 4. A space x is provided between the facing end faces of the arms 9a, 9b to allow, as will be seen hereinafter, the introduction of the coupling elements of the second piece into the radial slot 2 of the hub 1 through the opening 8 of the barrel 4. In this manner, the assembly can be assembled and disassembled only in one determined angular position of the first piece relative to the second piece.

The diameter D of the axial recess 5 of the barrel corresponds to the diameter d of the hub 1 such that the hub 1 can be housed in this axial recess 5 with no play while being able to freely rotate therein.

In this embodiment of the articulated assembly, the first piece is formed by a temple 10 of the spectacles frame. The end of this temple 10 to be fixed to the hinge comprises two elastically deformable arms 11, 11a which terminate at tips 12, 12a having facing inner faces which flare in the direction of the end of the temple 10. These tips comprise a retaining catch 13, 13a. The distance p between the retaining catch 13, 13a of each tip 12, 12a and the front edge 14 of the end of the temple 10 corresponds to the thickness of the cylindrical wall of the barrel 4 and the distance Q separating the inner edges of the elastically deformable arms 11 corresponds, once assembled and ideally, to a distance equal to or slightly less than the distance r separating the bottom of the grooves 6a and 7a of the barrel 4. Finally, the length L of the arms 12, 12a corresponds to the distance l equal to the outer diameter of the barrel 4 minus the value of the thickness of its cylindrical wall.

This first piece, the temple 10 of the spectacles frame, is to be fixedly attached to the barrel 4 of the hinge. This is accomplished by arranging the hub 1 in the axial recess 5 of the barrel 4 then introducing the arms 12, 12a into the grooves 6a, 7a of the barrel until the retaining catches 13, 13a clip onto the peripheral surface of the axial recess 5 of the barrel 4 and the front edge 14 of the temple 10 comes to abut against the outer peripheral wall of the barrel (see FIG. 14). The first piece, the temple 10, is thus fixedly attached to the hinge 1, 4 by simply clipping the tips 12, 12a into the grooves 6a, 7a. In the clipped in-use position, the front faces of the tips 12 are at the outer peripheral face of the barrel 4. It should also be noted that this clipping of the temple 10 on the barrel 4 ensures that the hub 1 is kept within the axial recess 5 of the barrel.

In this embodiment of the articulated assembly, the second piece is formed by the central face or part 15 of the spectacles frame suitable for supporting the lenses.

Each end of this central part 15 of the spectacles frame comprises coupling elements 16, 16a suitable for being introduced into the radial slot 2 of the hub 1 of the hinge and retaining elements 17, 17a cooperating in the in-use position with the cylindrical wall of revolution of the axial recess 5 of the barrel 4.

Each end of the central part 15 of the spectacles frame is formed of two plates 16a, 16b, one plate 16a being fixedly attached to the upper part 15a of the face of the spectacles frame, and the other plate 16b being fixedly attached to the lower part 15b of the face of the spectacles 15. The upper part 15a and the lower part 15b of the face 15 of the frame are arranged to receive a spectacles lens and to keep it in place when the two plates 16a, 16b are brought closer together.

Each plate 16a, 16b comprises a coupling element 17a, 17b suitable for being introduced through the opening 8 of the barrel into the radial slot 2 of the hub 1 so as to couple this hub 1 to the second piece 15 such that the second piece, in this case the central part of the spectacles frame, is rotationally fixed to the hub 1 of the hinge. The coupling elements 17a, 17b further comprise retaining means 18a, 18b respectively coming to clip, by the intrinsic elasticity of the coupling elements 17, against the peripheral surface of the axial recess 5 of the barrel 4 so as to maintain said second piece 15 in the position coupled with said hub 1.

Figure 14:
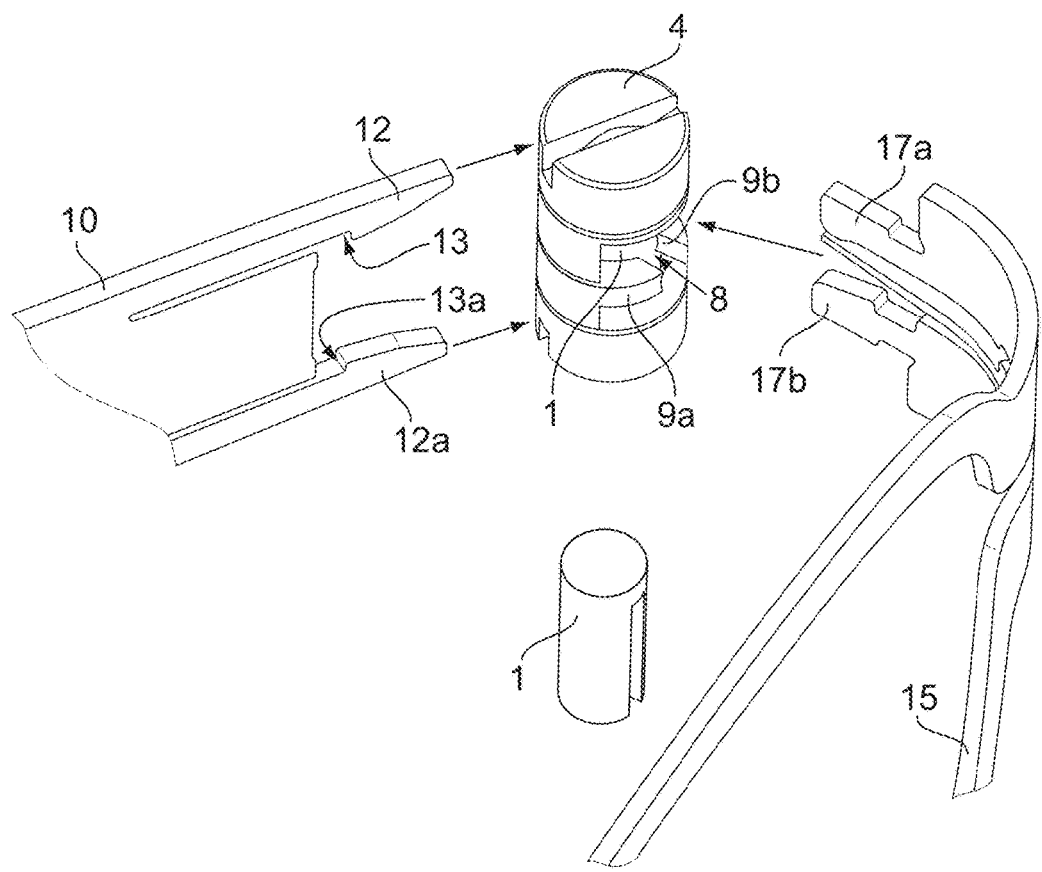
FIG. 14 illustrates how an articulated assembly in accordance with the invention is assembled.

The articulated assembly is assembled as shown in FIG. 14. Firstly, the hub 1 is introduced into the axial recess 5 of the barrel 4, taking care that the radial slot 2 of the hub 1 is located facing the space x located between the two arms 9a, 9b of the barrel 4.

Then, secondly, the first piece 10 is clipped on the barrel 4 by introducing the tips 12, 12a into the grooves 6a, 7a of the barrel until the retaining elements 13, 13a come to clip behind the cylindrical surface of the axial recess 5 of the barrel 4 thus fixedly attaching the first piece 10 with the barrel 4 of the hinge and preventing the hub 1 from exiting the barrel 4.

Finally, the coupling elements 17a, 17b of the second piece 15 are introduced through the opening 8 of the barrel and the space x provided between the two arms 9a, 9b of this barrel 4 into the radial slot 2 of the hub 1. This hub 1 is therefore rotationally coupled to said coupling elements 17a, 17b of the second piece 15. By forcibly introducing these coupling elements 17a, 17b into the hub 1, they elastically deform as they are brought closer to each other until the moment when the retaining means 18a, 18b clip against the peripheral wall of the central recess 5 of the barrel 4. At this moment, the front edge 19 of the second piece 15 abuts against the outer wall of the barrel 4.

As of this moment, the first piece 10 is fixedly attached to the barrel of the hinge and the second piece 18 is engaged in the hub 1 and is coupled to the barrel 4. In this in-use position, the first piece 10 can rotate about the axis of the hub 1 relative to the second piece 15 over an angular distance determined by the angular extent α of the opening 8 of the barrel. For each of the two end positions of the first and second pieces, the coupling elements 17 come to abut against a lateral wall of the opening 8.

The arms 9a, 9b pass between the coupling elements 17 owing to a cut-out 17c formed in one of these coupling elements.

By selecting the rigidity and dimension of the coupling elements 17a, 17b, the frictional forces between the second piece 15 and the barrel 4 fixedly attached to the first piece 10 can be adjusted such that the rotational movement of the pieces 10 and 15 is not totally free but is limited by the friction exerted between these coupling elements 17a, 17b and the barrel 4. This friction is exerted between the upper and lower walls 8a, 8b of the opening 8 and the faces 17d and 17e of the coupling elements 17a and 17b respectively. In this manner, it is possible to adjust—to a desired, predetermined, value—the torque necessary for pivoting the first piece relative to the second piece.

Figure 12:
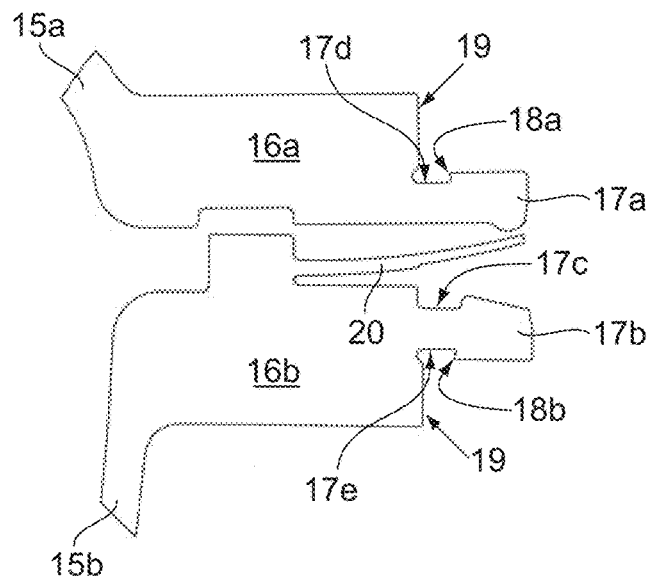
FIG. 12 illustrates a plan view of the end of a second piece of the articulated assembly suitable for cooperating with the hinge of this assembly.
Figure 13:
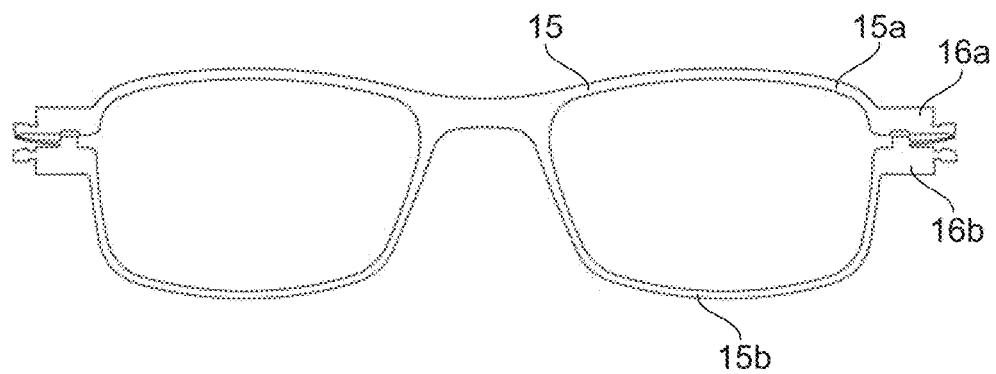
FIG. 13 illustrates the second piece of the articulated assembly formed by the central part of a spectacles frame.

When the end of the second piece 15 is designed as illustrated in FIG. 12, it further comprises an elastic tab 20 which tends to space apart the coupling elements 17a, 17b also allowing the friction between these coupling elements 17 and the barrel 4 of the hinge to be adjusted so as to obtain the desired friction for effective operation.

In embodiment variants of the articulated assembly, the arms 9a, 9b of the barrel 4 can be removed such that the assembly can be assembled and disassembled with the first 10 and second 15 pieces in any possible position relative to each other, and not in one relative position determined by these arms 9a, 9b.

The spring leaf 20 can be omitted.

In other variants, it is apparent that the shape of the elements for fixing the first piece to the body of the hinge as well as the shape of the coupling elements and retaining means of the second piece can vary in an infinite number of ways so long as the functions thereof are ensured.

The radial slot 2 of the hub can be replaced by a radial cavity whose dimensions, in particular the width, correspond to the thickness of the coupling elements 17a, 17b.

Figure 15:
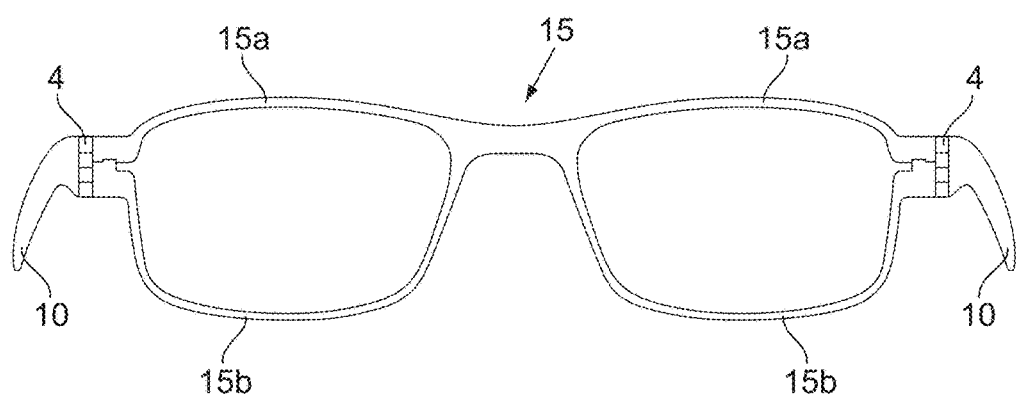
FIG. 15 illustrates a spectacles frame comprising two articulated assemblies in accordance with the invention.

FIG. 15 illustrates a spectacles frame whose face part 15 is coupled at each of its ends to a temple 10 via articulated assemblies such as those described above.

Figure 16:
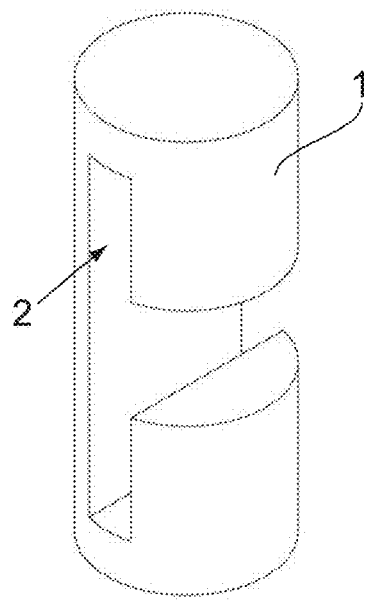
FIG. 16 illustrates a perspective view of a variant of the hub of the hinge of the articulated assembly.

FIG. 16 illustrates a variant of the hub 1 whose radial slot 2 does not open onto any of the axial faces thereof.

Figure 17:
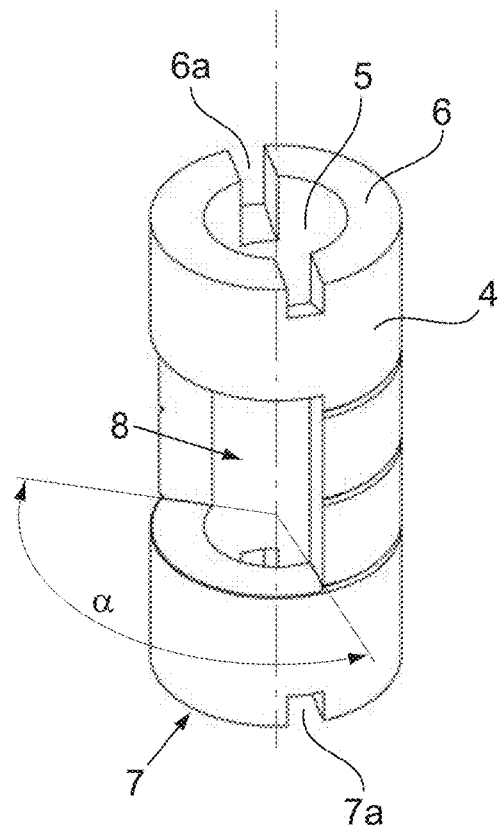
FIG. 17 illustrates a perspective view of a variant of the barrel of the hinge of the articulated assembly.

FIG. 17 illustrates a barrel 4 which does not comprise arms 9a, 9b, the opening 8 being completely open.

Of course, in the previous example, the face 15 of the spectacles frame could comprise, at these ends, fixing elements arranged to be fixedly attached to the barrel 4 and thus the temple 10 of the frame would comprise, at one of its ends, coupling elements and retaining means to be coupled to the hinge 1, 4. The first piece of the articulated assembly would thus be the face of the spectacles frame and the second piece of the articulated assembly would be the temple.

It may also be envisaged that the first piece of the articulated assembly and the second piece of this articulated assembly are formed by intermediate pieces connecting the barrel 4 to one piece and the hinge 1, 4 to another piece respectively.

Figure 18:
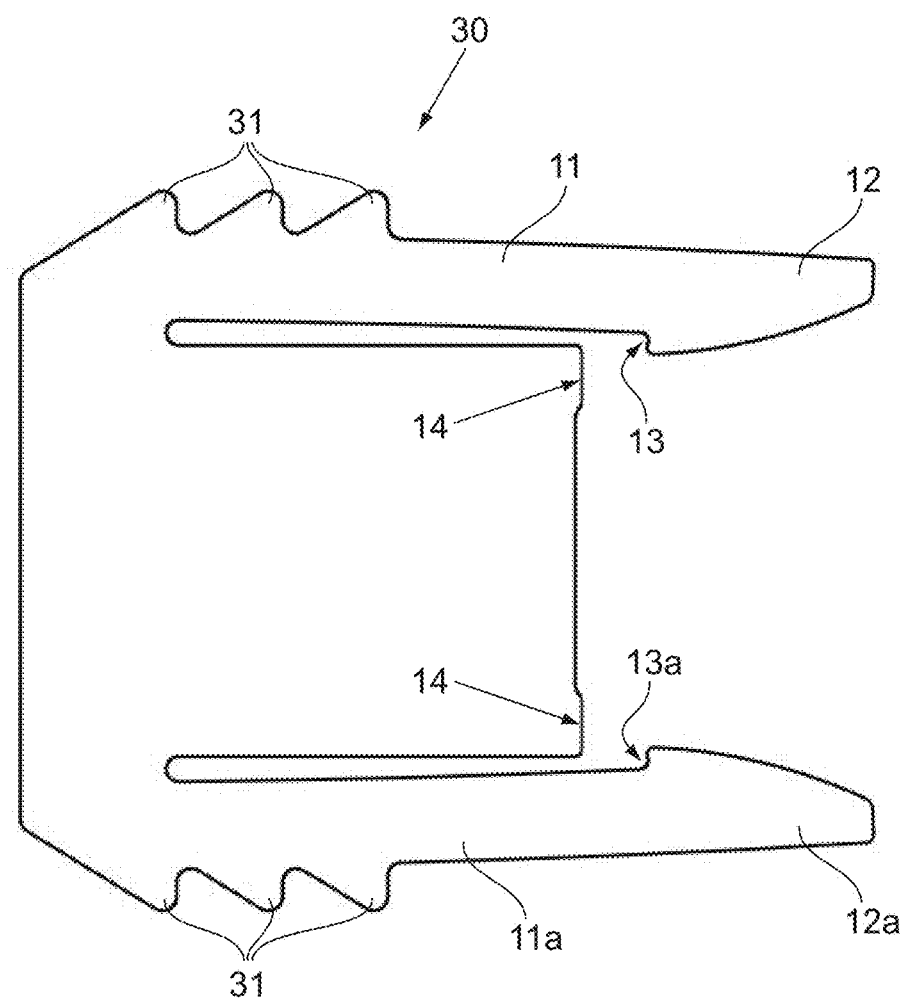
FIG. 18 illustrates a variant of the first piece of the articulated assembly in accordance with the invention.

Such a first piece formed by an intermediate piece 30 is illustrated in FIG. 18. This intermediate piece 30 forming the first piece of the articulated assembly comprises an end fitted with fixing elements 12, 13, 14 identical to those of the first piece 10 illustrated in FIG. 10 allowing this first intermediate piece 30 to be fixedly attached to the barrel 4, as described above. The other end of this first intermediate piece comprises assembling means 31 allowing it to be fixed to any piece comprising corresponding assembling means.

Figure 19:
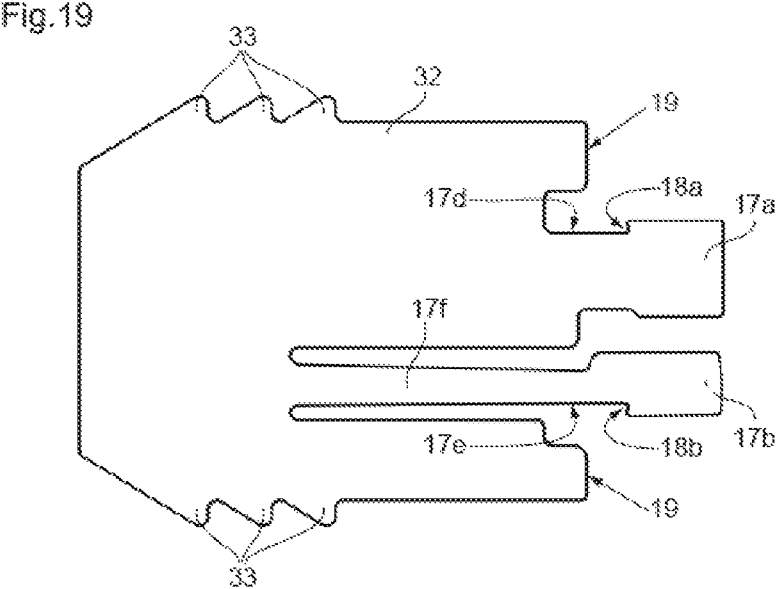
FIG. 19 illustrates a variant of the second piece of the articulated assembly in accordance with the invention.

FIG. 19 illustrates a second intermediate piece 32 forming the second piece of the articulated assembly, one end of which comprises coupling elements 17a, 17b and retaining means 18a, 18b allowing it to be coupled to the hinge 1, 4 in the same manner as the second piece of the first described embodiment. In this embodiment of the second piece 32, the coupling element 17b is supported by an elastic arm 17c allowing the two coupling elements 17a, 17b to be brought closer together for their introduction through the opening 8 of the barrel 4 into the radial slot 2 of the hub 1.

This second intermediate piece 32 comprises assembling means 33 allowing it to be fixed to any piece comprising corresponding assembling means.

Figure 20:
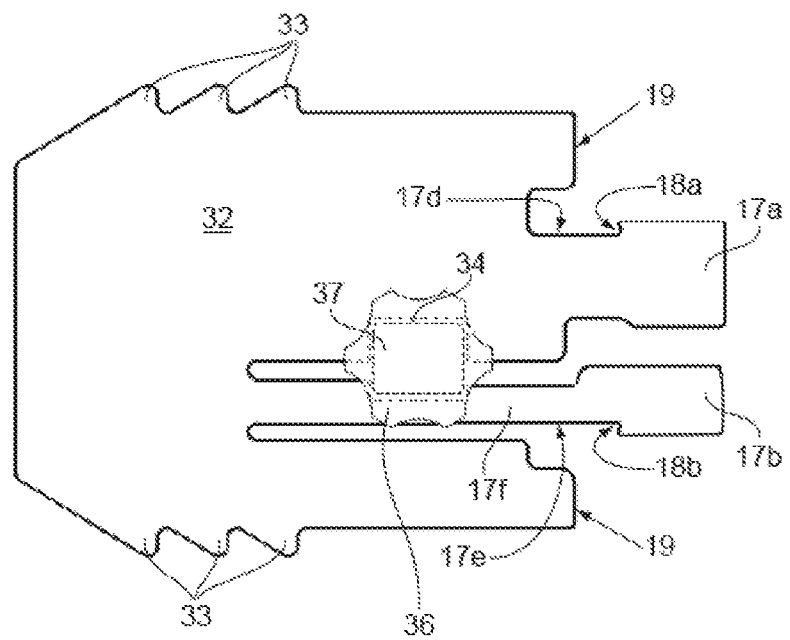
FIG. 20 illustrates another variant of the end of the second piece, provided with a latch.
Figure 21:
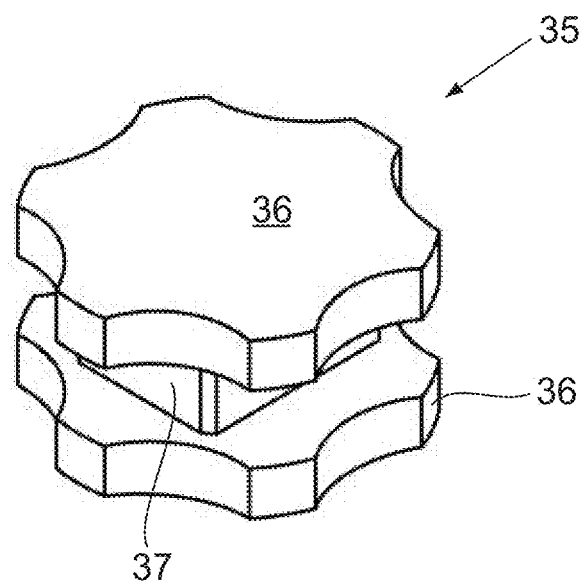
FIG. 21 illustrates a perspective view of a latch for the variant illustrated in FIG. 20.
Figure 22:
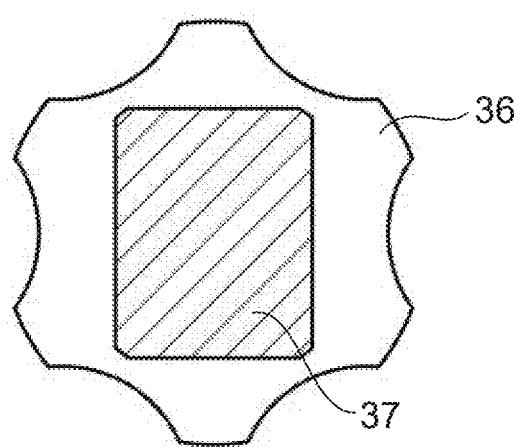
FIG. 22 is a cross-sectional view of the latch illustrated in FIG. 21.

A variant of this second intermediate piece 32 is illustrated in FIG. 20. It comprises, between the body of the intermediate piece 32 and the elastic arm 17*f*, a rectangular housing 34.

A latch 35 comprises a manoeuvring element 36 and a rectangular cam 37 corresponding to the shape of the housing 34. This latch 35 is slid between the elastic arm 17*f* and the body of the intermediate piece 32 such that the cam 37 is placed in the housing 34. Therefore, once coupled to the hinge 1, 4, this second intermediate piece 32 can be locked by rotating the latch 35 preventing the coupling elements 17*a*, 17*b* from being brought closer together and thus preventing the separation of the second intermediate piece 32 from the hinge 1, 4.

Of course, such an arrangement of coupling elements and retaining means can be provided on any second piece of the articulated assembly allowing it to be coupled to the hinge 1, 4 of this articulated assembly.

By changing the dimension of the cam 37 of the latch 35 arranged between the coupling elements 17*a*, 17*b*, the bearing force of the coupling elements 17*a*, 17*b* against the barrel 4 can be adjusted and set to a desired value and thus the frictional force between these coupling elements and the barrel can be modified or adjusted so as to adjust—to the desired value—the torque necessary to pivot the first piece relative to the second piece of the articulated assembly.

Figure 23:
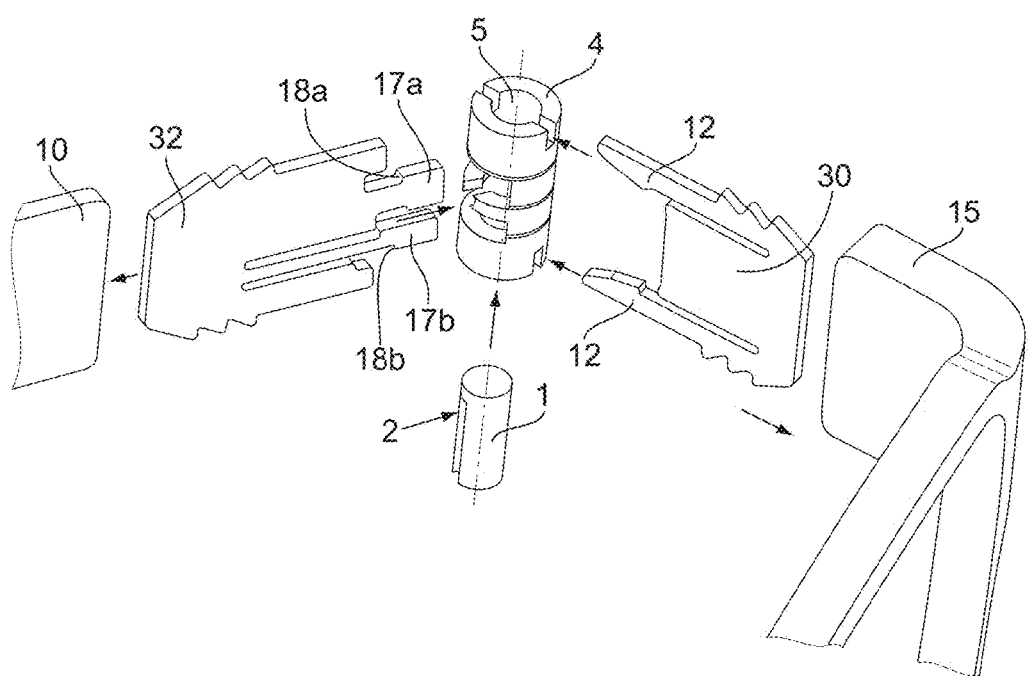
FIG. 23 illustrates how an articulated assembly, comprising first and second pieces in accordance with FIGS. 19 and 20 and a hinge in accordance with FIGS. 1 to 5, is assembled.

FIG. 23 illustrates how the articulated assembly comprising a first and second intermediate piece as illustrated in FIGS. 18 and 19 is assembled.

The hub 1 is introduced into the axial recess 5 of the barrel 4 to form the hinge 1, 4. The first intermediate piece 30 is thus fixedly attached to the barrel 4 using the tips 12 and then the coupling elements 17 of the second intermediate piece 32 are introduced through the opening 8 of the barrel 4 into the radial slot 2 of the hub 1 until the retaining means 18 clip against the cylindrical wall of the axial recess 5 of the barrel 4. Once the articulated assembly is assembled, a face of the spectacles frame 15 can be clipped to the first intermediate piece 30 and a temple 10 of the spectacles frame can likewise be clipped to the second intermediate piece 32.

Of course, pieces other than those of a spectacles frame 10, 15 can be clipped to the first and second intermediate pieces 30, 32.

Figure 24:
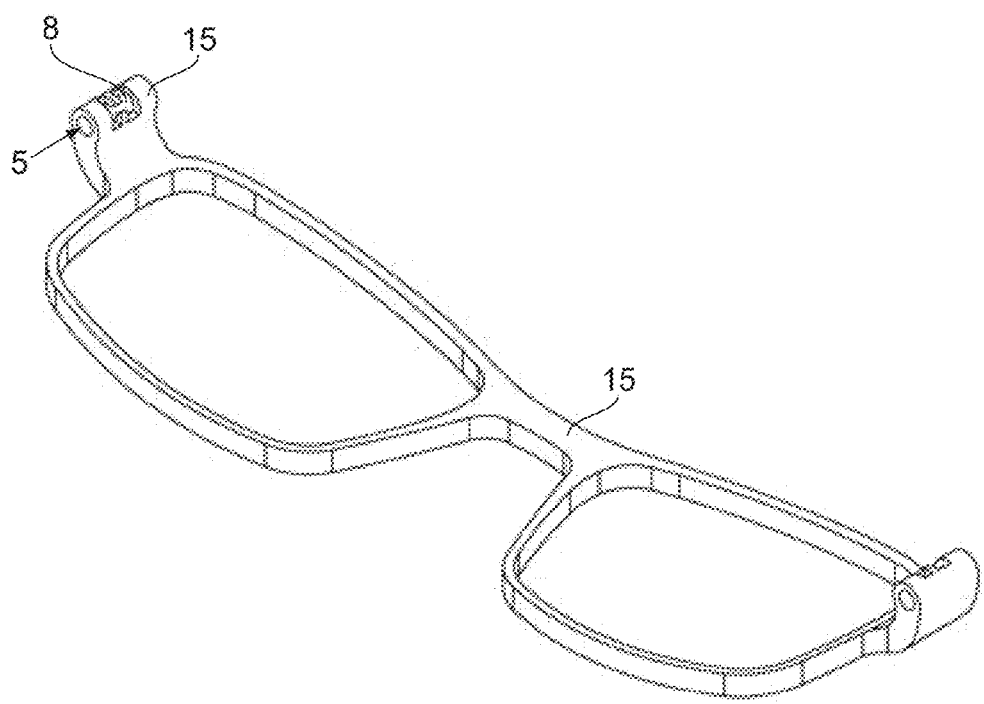
FIG. 24 illustrates an embodiment of the articulated assembly in which the barrel of the hinge is in one manufactured piece with the end of the second piece.
Figure 25:
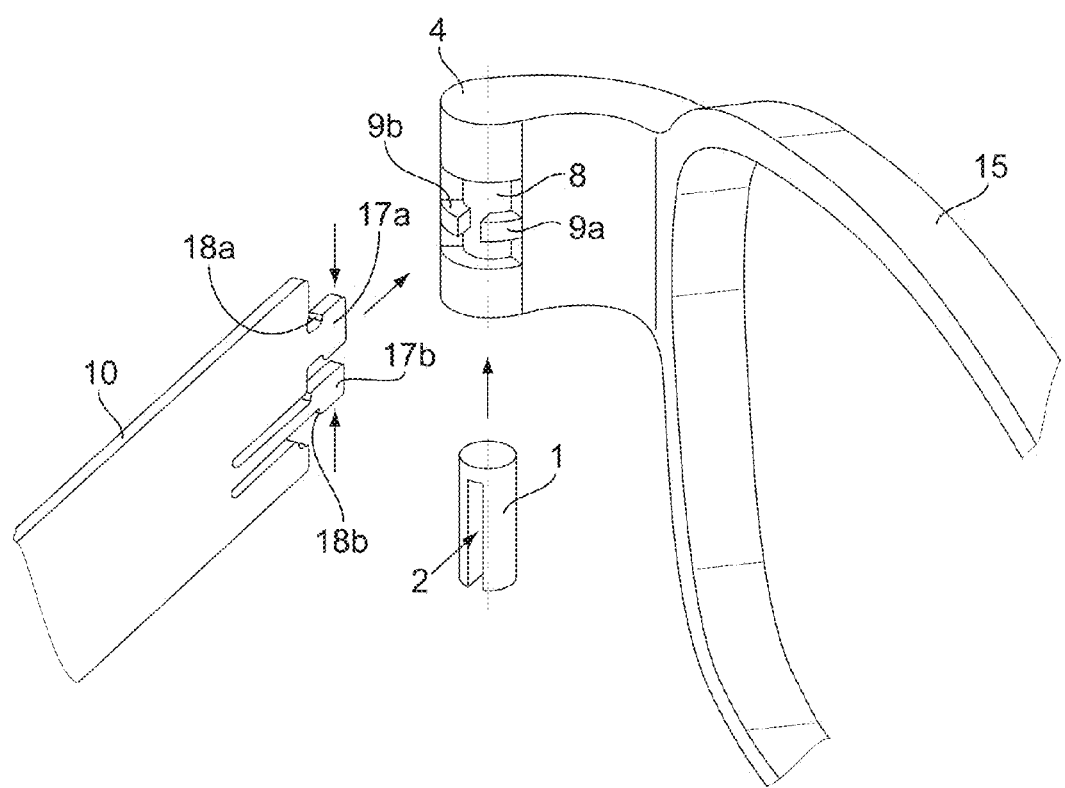
FIG. 25 illustrates how the articulated assembly, comprising a second piece in one manufactured piece with the barrel of the articulated assembly and a first piece suitable for cooperating with the hub of the hinge of the articulated assembly, is assembled.

A second embodiment of the articulated assembly is illustrated in FIGS. 24 and 25. In this embodiment, the body 4 of the hinge 1, 4 is in one manufactured piece with the end of a first piece, in this case the central part 15 of a spectacles frame. This body 4 comprises, as previously, a cylindrical axial recess of revolution 5 and a lateral opening 8. A hub 1 comprising a radial slot or cavity 2 is introduced into the axial recess 5 of the body and then the second piece of the articulated assembly, in this case a temple of a spectacles frame, comprising the previously described coupling elements 17 and retaining means 18 is coupled to the hinge 1, 4.

In the examples described above, the first piece of the articulated assembly is fixedly attached to the body 4 of the hinge 1, 4 by clipping or by the fact that the body 4 is in one manufactured piece with this first piece.

Of course, any other means allowing the body 4 to be fixedly attached to the first piece of the articulated assembly is feasible, such as adhering, welding, brazing or the like.

The second piece of the articulated assembly, i.e. the one which is coupled to the hinge 1, 4 by its coupling elements 17 and retaining means 18, can easily be decoupled from the hinge 1, 4 by bringing the coupling elements 17 closer to each other. This allows a second piece to be replaced if it is damaged or if the user wishes to modify the appearance, colour, shape, etc. of the object comprising the articulated assembly.

The invention further relates to a hinge connecting a first piece to a second piece. This hinge comprises a body 4 having a cylindrical axial recess of revolution 5 which opens onto at least one of the axial faces of the body 4 and a cylindrical hub of revolution 1, with a diameter d corresponding to the diameter D of the axial recess 5 of the body 4, fully housed in said axial recess 5; this hub 1 comprises a radial cavity 2 opening onto its periphery, and the lateral wall of the body 4 comprises an opening 8 with a predetermined angular extent α. The body 4 of this hinge is arranged to be fixedly attached to fixing elements 12 provided on the first piece or to be in one manufactured piece with this first piece. The radial cavity of the hub 1 of this hinge is suitable for receiving coupling elements 17 of the second piece passing through the opening 8 of the body 1, whose cylindrical wall of revolution of the axial recess 5 is suitable for cooperating with retaining means 18 provided on the second piece; the entire system arranged such that the first piece is articulated on the second piece about the axis of the axial recess 5 of the body 4 over an angular extent substantially corresponding to the angular extent α of the opening of said body 4.

Figure 26:
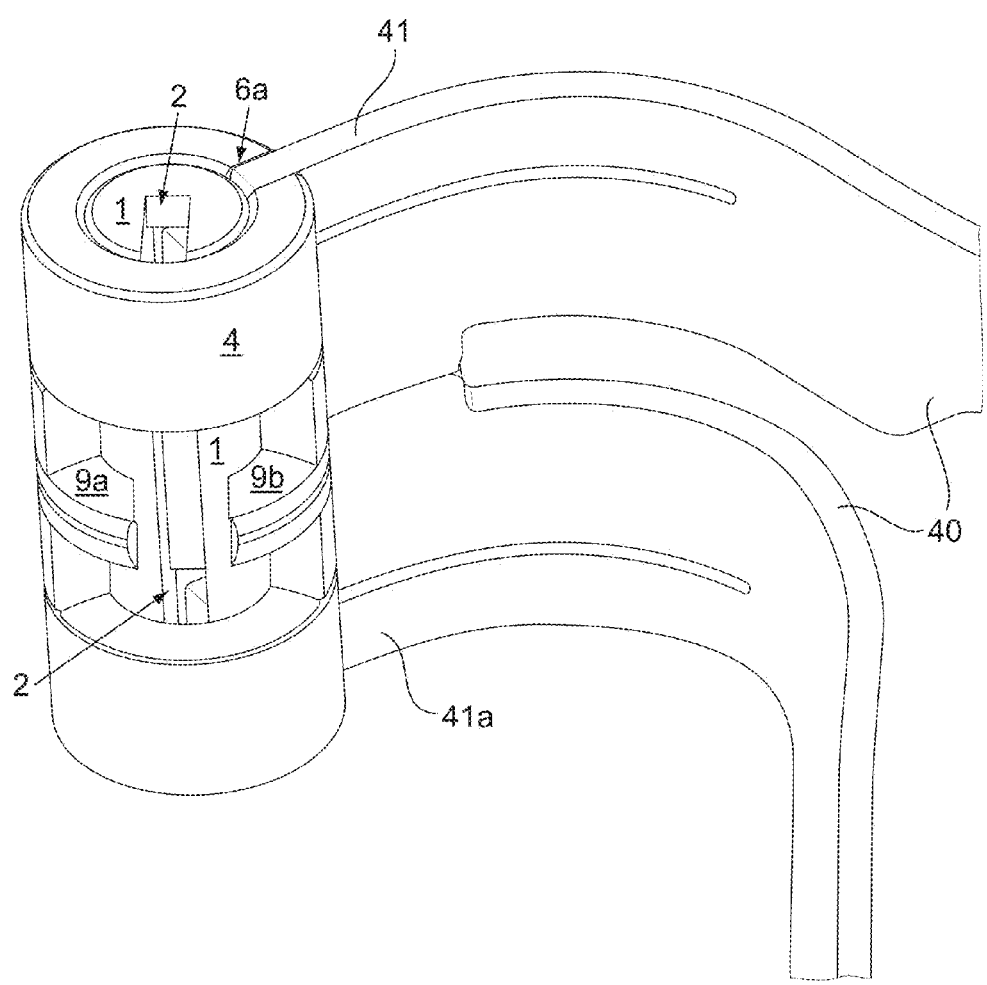
FIGS. 26 and 27 illustrate yet another embodiment of the hinge in accordance with the invention.
Figure 27:
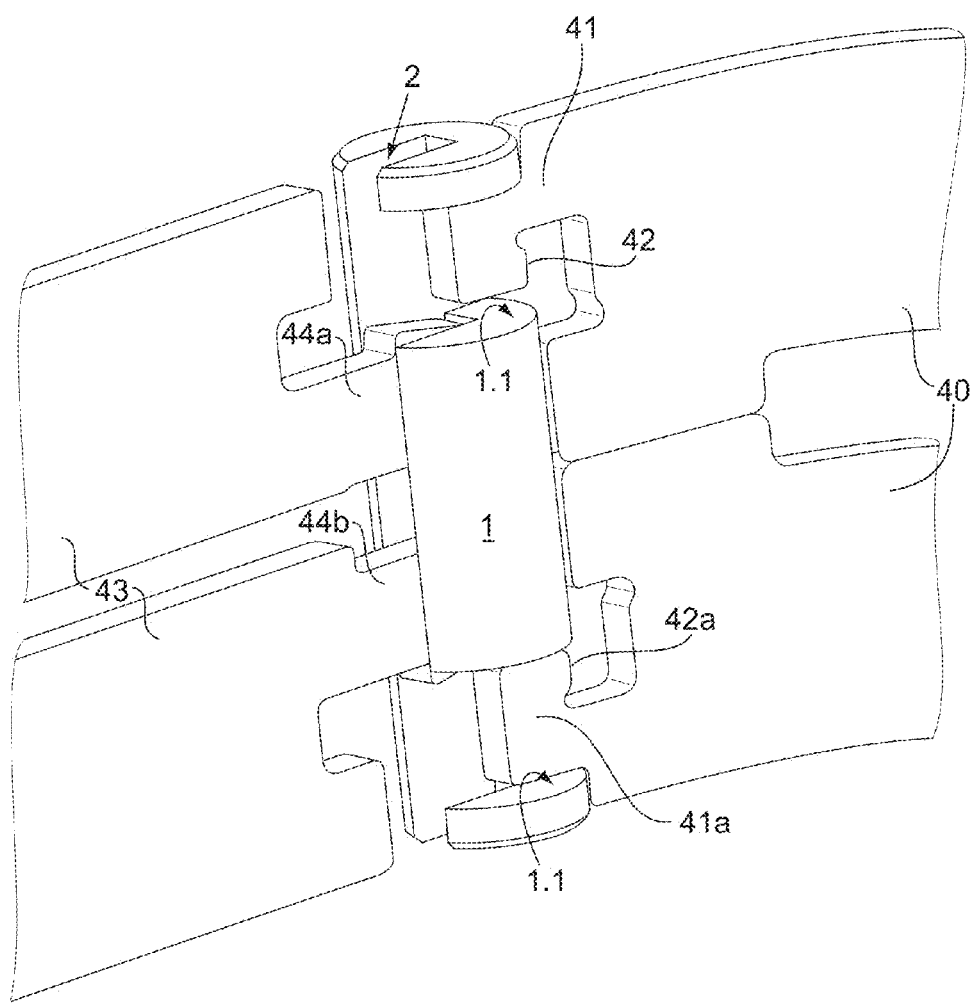

FIGS. 26 and 27 illustrate yet another embodiment of the hinge in accordance with the invention.

In this embodiment, the hinge is formed of a cylindrical hub of revolution 1 which comprises a radial slot 2 located in an axial plane of the hub but not passing through this hub from one side to the other. In contrast, this radial slot 2 extends over the entire length of the hub and opens onto each of its ends.

This hub 1 further comprises two countersunk holes 1.1 located close to its ends forming lateral openings in the hub each providing access to the radial slot 2 from substantially half of the periphery of the hub over a determined height of about a quarter of the height of said hub.

The body of the hinge is in this case formed by a barrel 4 practically identical to the barrel 4 of the first embodiment (FIGS. 5 to 9) except that the grooves 6*a*, 7*a* are not diametric but only radial.

In this embodiment of the articulated assembly, the first piece is formed by the central face or part 40 of a spectacles frame suitable for supporting the lenses. Each end of this central piece 40 of the spectacles frame is to be fixedly attached to the barrel 4 and has, for this purpose, fixing elements 41, 41*a* comprising retaining catches 42, 42*a*.

In order to fixedly attach this first part 40 to the barrel 4, the hub 1 is placed in the barrel 4 and the radial cavity 2 of the hub 1 is aligned with the radial slots 6*a*, 7*a* of the barrel 4. The fixing elements 41, 41*a* are thus introduced into the radial slots 6*a*, 7*a* of the barrel 4 and into the radial cavity 2 of the hub 1. The hub 1 is thus moved angularly with respect to the barrel 4, causing the fixing elements 41, 41*a* to be brought closer together. By bringing the fixing elements 41, 41*a* closer together in this way, the ends of these fixing elements come to be housed in the countersunk holes 1.1 of the hub and the retaining catches 42, 42*a* come to be housed behind the wall of the barrel 4.

In this case, the second piece 43 of the articulated assembly is a spectacles temple whose end comprises coupling elements 44a, 44b suitable for being introduced into the radial cavity of the hub 1 when this is aligned with the space x between the arms 9a, 9b of the barrel 4 and for being clipped by its coupling elements on the inner wall of the barrel 4, as per the other embodiments.

The interesting aspect about this particular embodiment is that the fixation of the central part of the spectacles frame 40 in the hinge causes the fixing elements 41 to be brought closer together which allows the spectacles frame to be clamped around the lenses. Therefore, the lenses in a pair of spectacles are fixed by a pinching action and no longer require clamping screws.

In the final embodiment of the hinge illustrated in FIGS. 28 to 32, likewise provided by way of example to be used as an articulation of the temples of a spectacles frame on the central part of this spectacles frame supporting the lenses, the first piece is formed in this example by the central part of the spectacles frame whilst the second piece is formed by a temple of the spectacles frame.

This hinge comprises a cylindrical hub of revolution 51 which comprises a radial slot 52 located in an axial plane of the hub 51. This hub 51 comprises a cylindrical, central bore 53 coaxial to the hub. The radial slot 52 thus connects the peripheral surface of the hub 51 to the central bore thereof along the entire length of this hub. This hub 51 thus comprises a central cavity formed by the central bore 53 and the radial slot 52. Thus hub 51 further comprises a central countersunk hole 54 connecting the central bore 53 to the peripheral surface of the hub over a middle portion of the hub over an angular portion of about 180°.

The hinge further comprises a body formed in this embodiment of the articulated assembly by a barrel 55 having a cylindrical axial recess of revolution 56 which opens onto at least the upper axial face 57 of the barrel 55. The upper 57 and lower 58 axial faces each comprise a radial groove 57a, 58a, which grooves are located in a single axial plane of the barrel 55. This barrel 55 further comprises an opening 59 formed in its peripheral wall thus connecting the exterior of the barrel 55 to its axial recess 56. The angular extent α of this opening 59 of the barrel 55 has a pre-established value determined by the value of the angle of rotation that the first piece must be able to cover with respect to the second piece of the spectacles frame.

In this final embodiment, the opening 59 is separated into two parts by arms 60a, 60b formed by portions of the cylindrical wall of the barrel 55. A space x is provided between the facing end faces of the arms 60a, 60b to allow, as will be seen hereinafter, the introduction of the coupling elements of the second piece into the radial slot 2 of the hub 51 through the opening 59 of the barrel 55. In this manner, the assembly can be assembled and disassembled only in one determined angular position of the first piece relative to the second piece.

The diameter D of the axial recess 56 of the barrel corresponds to the diameter d of the hub 51 such that the hub 51 can be housed in this axial recess 56 with no play while being able to freely rotate therein.

In this embodiment, the radial slots 57a and 58a are located in an axial plane of the barrel centred on the space x located between the arms 60a and 60b. This barrel 55 further comprises a longitudinal slot 61 located in the middle part of the barrel 55 in the plane containing the radial slots 57a and 58a but opposite the space x.

The first piece, in this case the central part of a pair of spectacles 62, comprises, at its end, fixing elements 12 formed on the one hand by one or two central leaves 63 passing, in the in-use position, through the longitudinal slot 61 and the wall of the hub 51 via said central countersunk hole 54. The end of these central leaves 63 comes to be housed in the central bore 53 and comprises retaining faces 64 cooperating, in the in-use position, with the inner surface of the cylindrical central bore 53 of the hub 51.

The fixing elements 12 of this end of the first piece comprise, on the other hand, stubs 65 which come to be housed in the radial slots 57a and 58a of the barrel 55.

Figure 28:
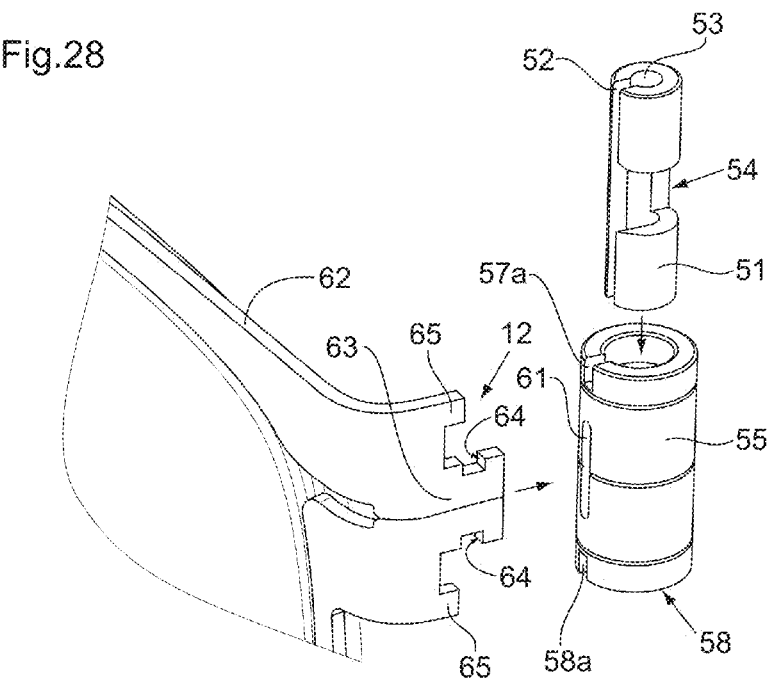
FIG. 28 illustrates how the first piece of a final embodiment is assembled on the body and the hub of the hinge.
Figure 29:
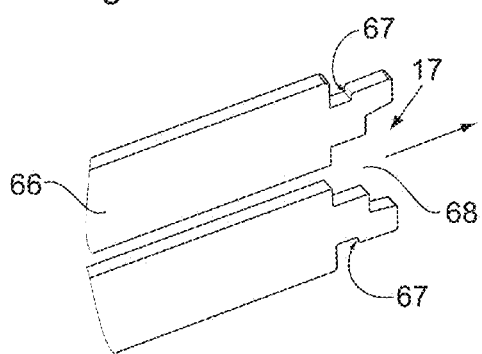
FIG. 29 illustrates the coupling elements of the second piece to be articulated on the first piece of this final embodiment.
Figure 30:
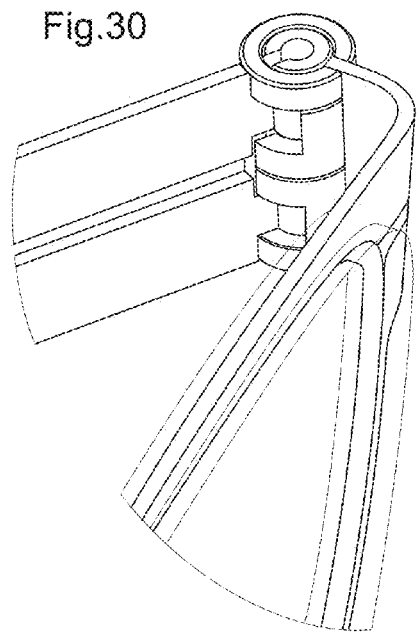
FIG. 30 illustrates the first and second piece coupled to the hinge of this final embodiment.

This first piece is assembled—in order to be fixedly attached to the barrel 55 of the hinge 51, 55—as illustrated in FIG. 28. The hub 51 is placed in the axial recess 56 of the barrel 55 such that the hub is fully in the barrel and that the radial slot 52 of the hub 51 coincides with the longitudinal slot 61 of the barrel 55.

The central leaves 63 of the fixing elements 12 of the first piece are introduced into the longitudinal slot 61 of the barrel 55 and the stubs of these fixing elements 12 are housed in the radial slots 57a, 58a of the barrel 55. When the central leaves 63 are completely recessed into the longitudinal slot 61 of the barrel, their ends comprising the retaining faces 64 are located in the central bore 53 of the hub. By rotating the hub 51 relative to the barrel 55, the retaining faces of the first piece come to cooperate with the inner surface of the central bore 53 of the hub whilst the central leaves 63 move into the countersunk hole 54 of the hub 51. The first piece 62 is thus fixedly attached to the barrel 55, no longer being able to exit the longitudinal slot of the barrel and the stubs 65 being engaged in the radial slots 57a, 58a.

The second piece 66 to be articulated on the first piece 62, formed in this case by a spectacles temple, comprises, at its end to be connected to the hinge 51, 55, coupling elements 17 suitable for being introduced into the radial slot 52 of the hub 51 through the opening 59 of the barrel 55 and comprising retaining means 67 cooperating, in the in-use position introduced into the radial slot 52 of the hub 51, with the cylindrical wall of revolution of the axial recess 56 of the barrel 55.

In order to assemble the second piece on the assembly formed by coupling the first piece 62 to the hinge 51, 55, the hub 51 is positioned angularly relative to the barrel 55 such that the radial slot 52 of the hub 51 is aligned with the space x separating the two arms 60a, 60b of the barrel 55, and then the coupling elements 17 are introduced through the space x into the radial slot 52 of the hub 51 by bringing the retaining means 67 closer to each other until these retaining means 67 clip behind the cylindrical wall of the central recess 56 of the barrel 55. These coupling elements 17 of this second piece 66 comprise a recess 68 which, once the second piece is fixedly attached to the hinge, provides a passage for the arms 60a, 60b allowing the angular displacement of the first piece relative to the second piece.

Generally, the interesting aspect of this hinge is, in particular for the articulation of spectacles temples, that there is no longer a need to use screws, rivets, glue, adhesives or any other means for mounting and articulating the spectacles temples on the front part of a spectacles frame, the temples and the face part being assembled and disassembled by clipping onto the hinge.

Although the particular examples described and illustrated relate to spectacles frames, the screwless hinge described can, as stated in the introduction, likewise be used in the fields of jewellery, horology and in the leather trade.

The invention claimed is:

1. An articulated assembly comprising:
    a first piece connected to a second piece by a screwless hinge, the hinge comprising a body having a cylindrical axial recess of revolution which opens onto at least one of the axial faces of the body, and a cylindrical hub of revolution having a hub diameter corresponding to a recess diameter of the axial recess of the body, the hub being fully housed in said axial recess and comprising a radial cavity opening onto the periphery thereof, the lateral wall of the body comprising an opening with a predetermined angular extent, the first piece comprising an end provided with fixing elements configured to be fixedly attached to the body of the hinge, the second piece comprising an end provided with coupling elements configured to be introduced into the radial cavity of the hub through the opening of the body, the coupling elements configured to be elastically deformed during introduction through the opening, the coupling elements including retaining elements cooperating, in an in-use position introduced into the axial cavity of the hub, with the cylindrical wall of revolution of the axial recess of the body, wherein the articulated assembly is configured such that the first piece is articulated on the second piece about the axis of the axial recess of the body over an angular extent substantially corresponding to the angular extent of the opening of said body.

2. The assembly as claimed in claim 1, wherein the radial cavity of the hub is a radial slot diametrically passing through the hub and opening onto one of its axial faces.

3. The assembly as claimed in claim 1, wherein the body comprises two arms extending into the opening and facing each other, separated by a distance from each other, the distance being sufficient to provide a passage for the coupling elements of the second piece to allow the second piece to be assembled to the hinge only in a predetermined angular position of the second piece relative to the hinge.

4. The assembly as claimed in claim 3, wherein the end of the second piece comprising the coupling elements comprises a housing between the two coupling elements.

5. The assembly as claimed in claim 4, wherein a latch comprising a cam is arranged in the housing.

6. The assembly as claimed in claim 1, wherein the body is a barrel.

7. The assembly as claimed in claim 6, wherein the coupling elements of the second piece exert a friction against the upper and lower edges of the opening of the barrel.

8. The assembly as claimed in claim 1, wherein the body is formed as one manufactured piece with the end of the first piece or of the second piece.

9. The assembly as claimed in claim 8, wherein the body forms the end of the first piece configured to be connected by a hinge to the second piece of the assembly.

10. The assembly as claimed in claim 1, wherein the radial cavity of the hub is a radial slot diametrically extending in the hub and opening onto its two axial faces and onto the periphery of the hub.

11. The assembly as claimed in claim 10, wherein the hub comprises two countersunk holes close to ends of the hub receiving, in the assembled position, the ends of the fixing elements of the first piece, the countersunk holes connecting the radial cavity to the periphery of the hub.

12. The assembly as claimed in claim 11, wherein the body is a barrel, and in the assembled position, retaining catches of the fixing elements of the first piece clip behind the inner wall of the barrel.

13. The assembly as claimed in claim 1, wherein the fixing elements at the end of the first piece cooperate with the body of the hinge of the assembly.

14. The assembly as claimed in claim 13, wherein the fixing elements are configured to clip into grooves formed in the ends of the body.

15. The assembly as claimed in claim 1, wherein the elastically deformable coupling elements provided at the end of the second piece are configured to engage into the radial cavity of the hub of the assembly, and the retaining elements are configured to cooperate with the body of the hinge of the assembly.

16. A spectacles frame having temples and a face part that form the first and second pieces respectively of assemblies as claimed in claim 1.

17. The assembly as claimed in claim 1, wherein the radial cavity comprises a cylindrical central bore, a radial slot connecting the cylindrical central bore to the outer surface of the hub, and a central countersunk hole, the body is formed by a barrel comprising a longitudinal slot, the fixing elements of the first piece comprise one or two central leaves passing, in the in-use position, through the longitudinal slot of the body and the wall of the hub by said central countersunk hole, and the end of which, housed in the cylindrical central bore of the hub, comprises retaining faces cooperating with the inner surface of the cylindrical central bore of the hub.

18. The assembly as claimed in claim 17, wherein the fixing elements of the first piece further comprise stubs engaged, in the assembled position, in radial grooves of the barrel.

19. A hinge configured to connect a first piece to a second piece, the hinge comprising:

a body having a cylindrical axial recess of revolution which opens onto at least one of the axial faces of the body and a cylindrical hub of revolution having a hub diameter corresponding to a diameter of the axial recess of the body, the hub being fully housed in said axial recess and comprising a radial cavity opening onto the periphery thereof, the lateral wall of the body comprising an opening with a predetermined angular extent, the body is configured to be fixedly attached to fixing elements provided on the first piece, the radial cavity of the hub being configured to receive coupling elements of the second piece passing through the opening of the body, the coupling elements being configured to be elastically deformed during introduction through the opening, the cylindrical wall of revolution of the axial recess of the body being configured to cooperate with retaining elements provided on the second piece, so that the first piece is configured to be articulated on the second piece about the axis of the axial recess of the body over an angular extent substantially corresponding to the angular extent of the opening of said body.

20. The hinge as claimed in claim 19, wherein the radial cavity of the hub opens onto the two axial faces of the hub and onto the periphery thereof.

21. The hinge as claimed in claim 20, wherein the hub has two countersunk holes close to its ends connecting the radial cavity to the periphery of the hub.

* * * * *